No. 795,408. PATENTED JULY 25, 1905.
C. B. NEBINGER.
COMBINED TEA AND COFFEE POT.
APPLICATION FILED SEPT. 30, 1904.

2 SHEETS—SHEET 1.

Witnesses.
A. H. Opsahl.
E. W. Jeppesen.

Inventor.
C. B. Nebinger.
By his Attorneys.
Williamson Merchant

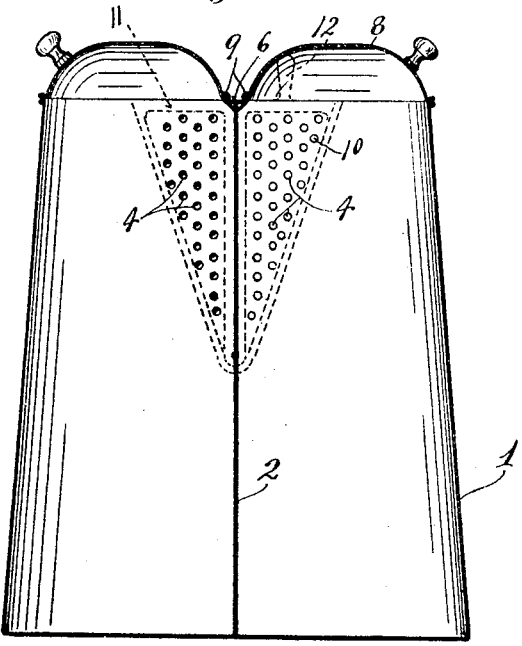
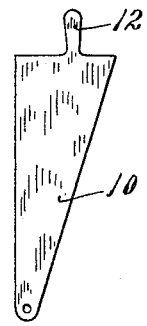
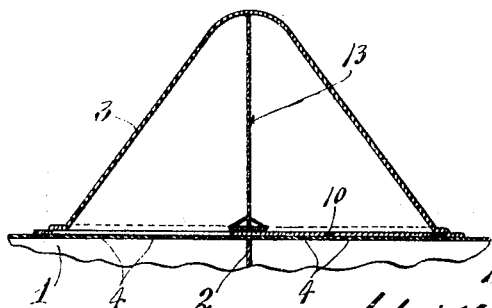

UNITED STATES PATENT OFFICE.

CHARLES B. NEBINGER, OF ST. PAUL, MINNESOTA.

COMBINED TEA AND COFFEE POT.

No. 795,408.　　　　Specification of Letters Patent.　　　　Patented July 25, 1905.

Application filed September 30, 1904. Serial No. 226,616.

*To all whom it may concern:*

Be it known that I, CHARLES B. NEBINGER, a citizen of the United States, residing at St. Paul, in the county of Ramsey and State of Minnesota, have invented certain new and useful Improvements in a Combined Tea and Coffee Pot; and I do hereby declare the following to be a full, clear, and exact description of the invention, such as will enable others skilled in the art to which it appertains to make and use the same.

My invention has for its object to provide a simple and efficient combined coffee and tea pot from which at will either coffee or tea may be poured; and to such ends the invention consists of the novel devices and combinations of devices hereinafter described, and defined in the claims.

The invention is illustrated in the accompanying drawings, wherein like characters indicate like parts throughout the several views.

Figure 1:
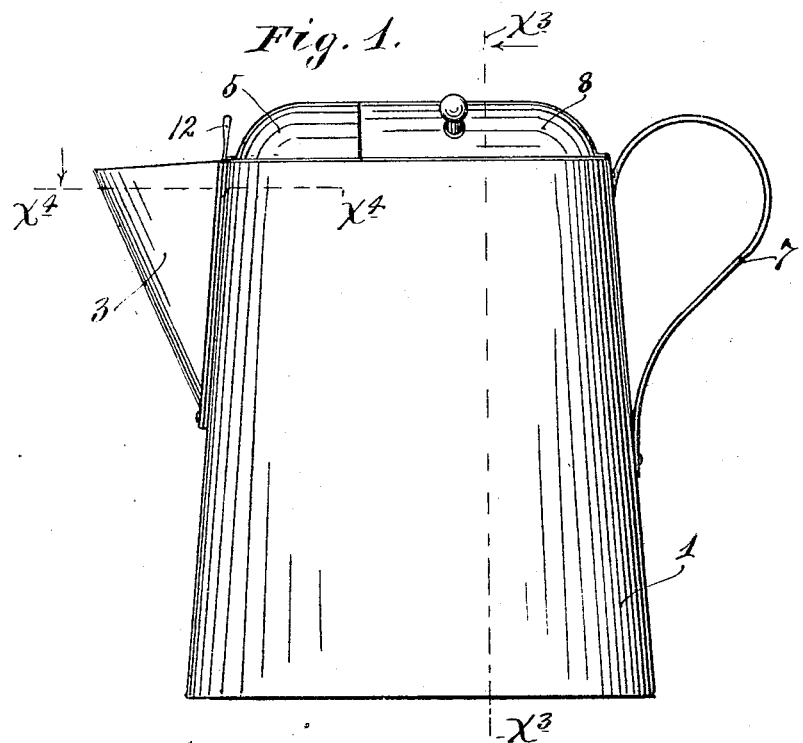
Figure 2:
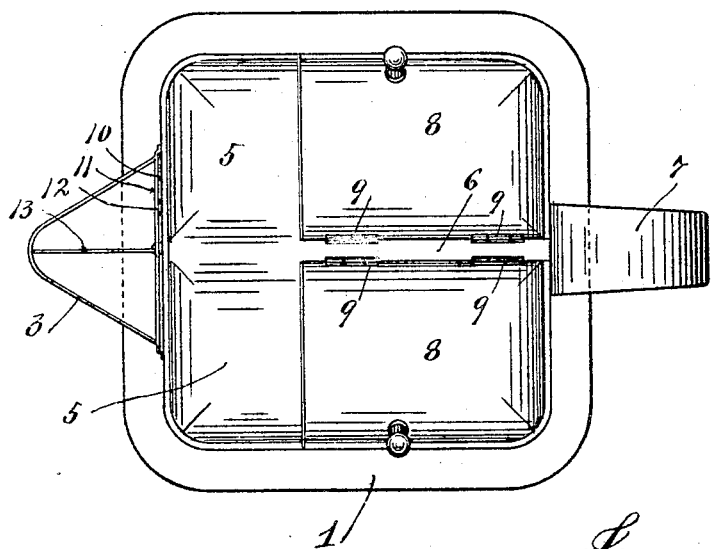

Figure 1 is a side elevation of the improved combination-pot. Fig. 2 is a plan view of the same. Fig. 3 is a transverse vertical section on the line $x^3$ $x^3$ of Fig. 1. Fig. 4 is a horizontal section on the line $x^4$ $x^4$ of Fig. 1, some parts being broken away; and Fig. 5 is a detail view showing in elevation a cut-off valve which is mounted in the spout of the pot.

The body 1 of the pot is divided into two compartments by a centrally-located vertical partition 2 and is provided with a spout 3, that communicates with the interiors of the two chambers of the pot through perforations 4, formed in the front wall of the pot-body. A hood 5 is secured to the upper forward edge of the pot-body 1 and extends over both compartments thereof. A centrally-located rib 6 connects the rear central portion of the hood 5 to the rear upper edge portion of the body 1 just above the handle 7 thereof. Lids 8 are hinged at 9 to the rib 6 and normally close each one of the compartments of the pot. The numeral 10 indicates a cut-off valve in the form of an angular plate, the lower end of which is pivoted at the bottom of the spout 3 to the perforated wall of the pot-body 1. This valve closely engages with the perforated surface of said body 1 and is held against outward lateral movements by a transverse guide-bar 11, secured to the upper portion of said spout. The said valve 10 at its free upper end and as shown is provided with a finger-piece 12, by means of which it may be moved. The spout 3 is divided into two compartments by a vertical central partition 13. The valve 10 is adapted to be moved completely to either side of the spout-partition 13, and when moved to one side thereof it will close all the perforations 4 on that side of the partitions 2 and 13 and will open up all of the perforations 4 on the other side of said partitions. With this construction it is evident that with coffee contained in one compartment and tea contained in the other compartment of the pot either may be poured from the pot without permitting the escape of the other by the proper adjustments or movements of said cut-off valve 10. It is also evident that the construction described while extremely simple and of small cost is efficient for the purposes had in view and that the valve may be quickly operated.

The two-chamber pot described is of course capable of use for holding various different classes of liquids—such, for instance, as cream and milk. As is further evident, the pot may be made in various sizes and may be constructed of any suitable metal or other material.

What I claim, and desire to secure by Letters Patent of the United States, is as follows:

1. The combination with a pot-body 1 divided into two compartments by a partition 2, and having the perforations 4, of the spout 3 secured to said body 1, embracing said perforations 4, and itself divided into two compartments by a partition 13, said spout also having a transverse guide-bar 11, and the cut-off valve 10 pivoted at its lower end at the bottom of said spout, working over the perforations 4, and provided with a finger-piece 12 at its free upper end, and which valve is adapted to be moved at will, entirely to either side of said partitions 2 and 13, substantially as described.

2. The combination with a pot-body 1 divided into two compartments and having a spout which is also divided into two compartments, the compartments of said spout communicating with the corresponding compartments of said pot-body through a plurality of perforations, of a valve working in said spout, and movable to close the spout-perforations of either compartment, said pot-body having the hood 5, and the hinged lids 8, substantially as described.

In testimony whereof I affix my signature in presence of two witnesses.

CHARLES B. NEBINGER.

Witnesses:
  H. D. KILGORE,
  F. D. MERCHANT.